US011161379B2

United States Patent
Qiu

(10) Patent No.: US 11,161,379 B2
(45) Date of Patent: Nov. 2, 2021

(54) TIRE PRESSURE SENSOR WITH LOCKING FEATURE

(71) Applicant: AUTEL INTELLIGENT TECHNOLOGY CORP., LTD., Guangdong (CN)

(72) Inventor: Longxue Qiu, Guangdong (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 134 days.

(21) Appl. No.: 16/578,773

(22) Filed: Sep. 23, 2019

(65) Prior Publication Data

US 2020/0016944 A1 Jan. 16, 2020

Related U.S. Application Data

(63) Continuation of application No. PCT/CN2018/094538, filed on Jul. 4, 2018.

(30) Foreign Application Priority Data

Jul. 6, 2017 (CN) .......................... 201710547019.1

(51) Int. Cl.
*B60C 23/04* (2006.01)
*B60C 29/02* (2006.01)

(52) U.S. Cl.
CPC .......... *B60C 23/0494* (2013.01); *B60C 29/02* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2006/0032300 A1* 2/2006 Luce ................... B60C 23/0408
73/146.2
2006/0125612 A1* 6/2006 Okubo .................... F16K 15/20
340/445
(Continued)

FOREIGN PATENT DOCUMENTS

CN 204623029 U 9/2015
CN 205086612 U 3/2016
(Continued)

OTHER PUBLICATIONS

Extended European Search Report dated Dec. 9, 2019; Appln. No. 18827767.7.

*Primary Examiner* — Andre J Allen

(57) ABSTRACT

The disclosure relates to the field of automobile detection apparatus technologies, and provides a tire pressure sensor including: a sensor body, a valve assembly connected to the sensor body, a locking member, a resilient member, and a button; wherein a fixture block assembly is disposed at a connecting end of the valve assembly; the locking member is disposed within the sensor body, and the locking member limiting the fixture block assembly when the connecting end is inserted into the sensor body; the button is disposed within the sensor body, and when the button receives an external force, the button transmits an external force to the fixture block assembly, so that the locking member relieves limiting of the fixture block assembly. An entire process of installation and disassembly of the tire pressure sensor becomes simpler and faster.

18 Claims, 3 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28

USPC .................................................. 73/146–146.8
See application file for complete search history.

(56) References Cited

U.S. PATENT DOCUMENTS

| | | | | |
|---|---|---|---|---|
| 2008/0250852 | A1* | 10/2008 | Capdepon | B60C 23/0494 73/146.8 |
| 2009/0007649 | A1* | 1/2009 | Kempf | B60C 23/0408 73/146.8 |
| 2012/0222478 | A1* | 9/2012 | Kanenari | B60C 23/0408 73/146.5 |
| 2015/0273957 | A1* | 10/2015 | Kempf | B60C 23/0496 73/146.8 |

FOREIGN PATENT DOCUMENTS

| | | |
|---|---|---|
| CN | 106004265 A | 10/2016 |
| TW | 201541063 A | 11/2015 |
| WO | 2013/013789 A1 | 1/2013 |
| WO | 2015/172351 A1 | 11/2015 |
| WO | 2016/008091 A1 | 1/2016 |

* cited by examiner

TIRE PRESSURE SENSOR WITH LOCKING FEATURE

This application claims the priority to Chinese Patent Application No. 201710547019.1, entitled "TIRE PRESSURE SENSOR" filed with National Intellectual Property Administration, PRC on Jul. 6, 2017, which is incorporated by reference herein in its entirety.

BACKGROUND

Technical Field

The present invention relates to the field of automobile detection apparatus technologies, and in particular, to a tire pressure sensor.

Related Art

When a driver is driving on a road, driving safety shall be considered first, and tire pressure greatly influences vehicle conditions and has a crucial influence on driving safety. A tire needs to have a normal tire pressure to make a vehicle run smoothly. An excessively high or low tire pressure may cause tire burst or tire breaking, seriously affecting stability of vehicle driving and threatening life and property safety of passers-by. Therefore, tire pressure monitoring is undoubtedly important to driving safety.

In the process of implementing the present invention, the inventors find that a tire pressure sensor in the market is required to be dismantled or installed using tools, thereby causing inconvenience to disassembly and installation.

SUMMARY

Embodiments of the present invention provide a tire pressure sensor which may be disassembled and installed rapidly.

The embodiments of the present disclosure may provide a tire pressure sensor, the tire pressure sensor includes: a sensor body, a valve assembly connected to the sensor body, a locking member, and a button; wherein a fixture block assembly is disposed at a connecting end of the valve assembly; the locking member is disposed within the sensor body, and the locking member limiting the fixture block assembly when the connecting end is inserted into the sensor body; the button is disposed within the sensor body, and when the button receives an external force, the button transmits an external force to the fixture block assembly, so that the locking member relieves limiting of the fixture block assembly.

In some embodiments, the tire pressure sensor further includes a resilient member, the resilient member is disposed between the locking member and the button, and the resilient member abuts against the button.

In some embodiments, an accommodating groove for accommodating the locking member, the resilient member, and the button is disposed within the sensor body.

In some embodiments, a valve assembly hole perpendicular to the accommodating groove is further disposed within the sensor body, the accommodating groove and the valve assembly hole are connected with each other.

In some embodiments, a slot is disposed within the accommodating groove, the slot are connected with the valve assembly hole.

In some embodiments, the locking member includes a bottom plate. A left end and a right end of the bottom plate extend downward along a direction perpendicular to the bottom plate to respectively form a first extending portion and a second extending portion. The quantity of the slots is two, and the first extending portion and the second extending portion are respectively embedded into the two slots. In addition, one end of the first extending portion and one end of the second extending portion are located within the valve assembly hole.

In some embodiments, a first fixing hole and a second fixing hole are respectively disposed at the first extending portion and the second extending portion. A holding groove is respectively disposed on both left side and right side of the connecting end. The fixture block assembly includes a fixture block and an elastic member, one end of the fixture block has a semi-spherical shape and protrudes from a side face of the connecting end. The other end of the fixture block is located within the holding groove, and the fixture block may slide within the holding groove. After the sensor body is connected to the valve assembly, the two fixture blocks are respectively embedded into the first fixing hole and the second fixing hole.

In some embodiments, the elastic member is located within the holding groove, and one end of the elastic member abuts against the other end of the fixture block.

In some embodiments, a first stop block is disposed at the first extending portion, and a second stop block is disposed at the second extending portion. The button includes a bottom wall and a first side wall and a second side wall with a left end and right end of the bottom wall extending downward along a direction perpendicular to the bottom wall. A first bent portion and a second bent portion are respectively disposed on the first side wall and the second wall. The first bent portion abuts against the first stop block, and the second bent portion abuts against the second stop block.

In some embodiments, a first curved portion that is curved outward is disposed at one end of the first side wall away from the bottom wall, the first curved portion abuts against one end of the fixture block. A second curved portion that is curved outward is disposed at one end of the second side wall away from the bottom wall, the second curved portion abuts against one end of another fixture block.

In some embodiments, the button includes a bottom wall, a left end and a right end of the bottom wall extending downward along a direction perpendicular to the bottom wall to respectively form a first side wall and a second side wall, and an anti-slip structure is disposed on the bottom wall.

In the above embodiments, the connecting end of the valve assembly may be inserted into the valve assembly hole when the tire pressure sensor is required to be installed for use, and the locking member is configured to lock fixture block assembly, so that the valve assembly is fixed to the sensor body. When disassembly of the tire pressure sensor is required, the button is pressed to extrude the fixture blocks to escape from the locking of the locking member, and the tire pressure sensor is disassembled. Therefore, the entire process of installation and disassembly of the tire pressure sensor is simple and fast.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. As used in the specification, orientation or position relationships indicated by the teens such as "upper", "lower", "inside", "outside" and "bottom" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such teens should not be construed as limiting of the present invention. In addition, the terms such as "first", "second", and "third" are used only for the purpose of description, and should not be understood as indicating or implying relative importance.

As used herein, the term "and/or" includes any and all combinations of one or more related items listed.

In addition, the technical features provided in different embodiments of the present invention to be described below may be combined with each other as long as no conflict occurs.

Figure 1:
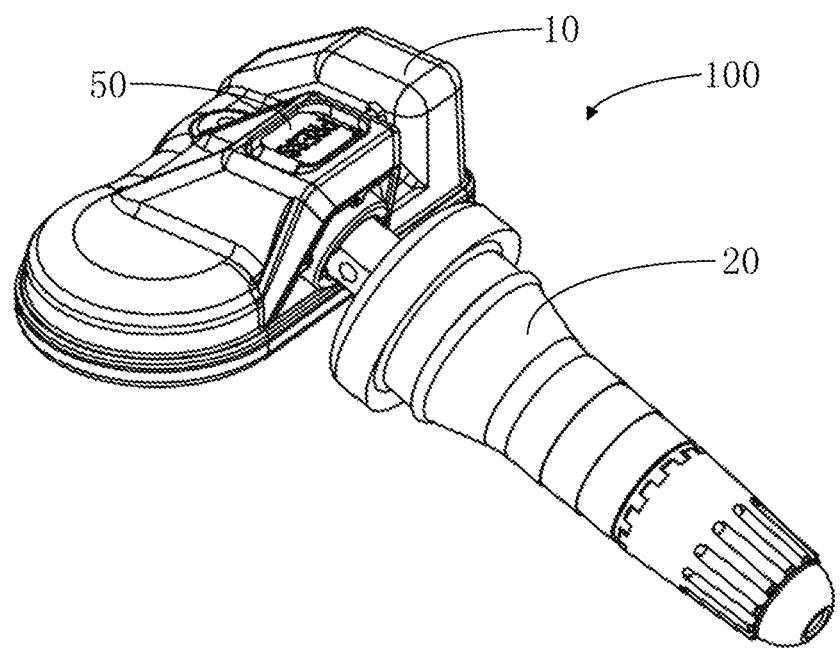
FIG. 1 is a schematic structural three-dimensional view of a tire pressure sensor which is in an installed state according to an embodiment of the present invention.
Figure 2:
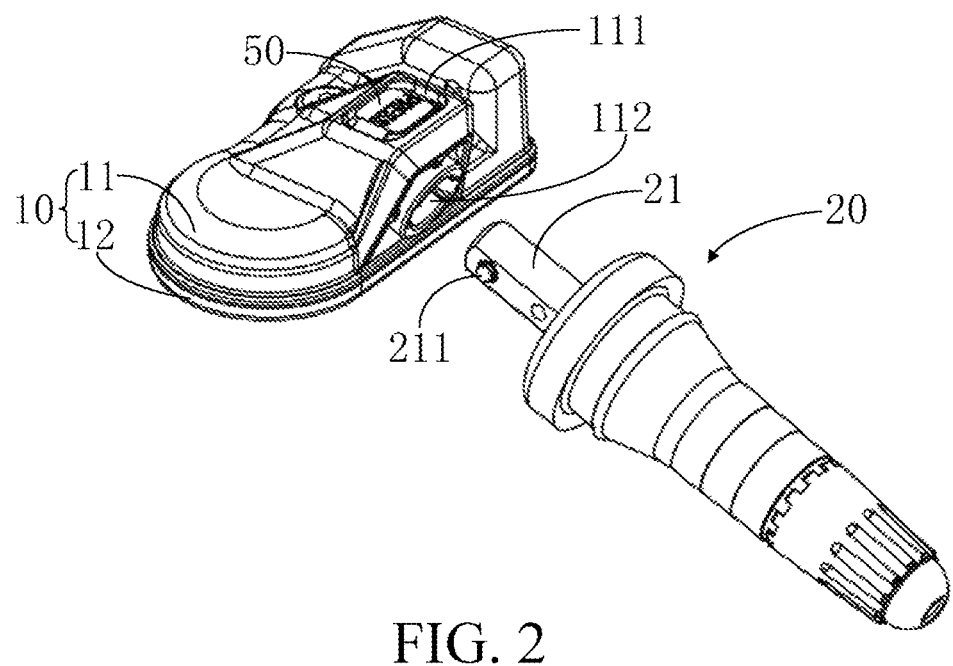
FIG. 2 is another schematic structural three-dimensional view of the tire pressure sensor which is in a disassembled state shown in FIG. 1.
Figure 3:
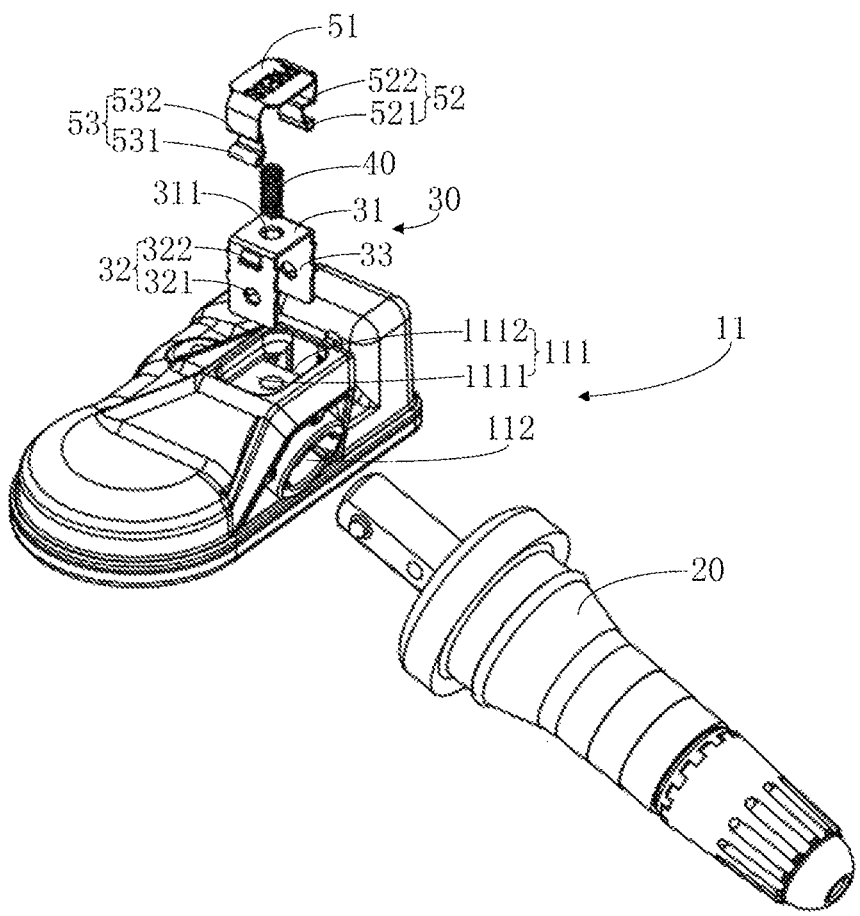
FIG. 3 is a schematic structural exploded view of the tire pressure sensor shown in FIG. 1.

Referring to FIGS. 1-3 together, an embodiment of the present invention provides a tire pressure sensor 100 installed on a rim of a wheel, and the wheel also includes an external tire. The tire pressure sensor includes a sensor body 10, a valve assembly 20 detachably connected to the sensor body, a locking member 30, a resilient member 40, and a button 50. A connecting end 21 of the valve assembly 20 has a fixture block assembly 211, which is flexible and may extend and retract along a radial direction of the connecting end. The locking member 30 is disposed within the sensor body 10, and when the sensor body 10 is connected to the valve assembly 20, the locking member 30 limits the location of the fixture block assembly 211. The button 50 is disposed on the sensor body 10. When the button 50 is pressed by an external force, the button 50 transmits the external force to the fixture block assembly 211, so that the locking member 30 relieves the location limitation of the fixture block assembly 211.

In some other embodiments, the fixture block assembly 211 is perpendicular to a side face of the connecting end 21 of the valve assembly 20 and protrudes inflexibly.

The sensor body 10 includes a first housing 11 and a second housing 12, the first housing 11 and the second housing 12 being snap-fitted with each other. An accommodating groove 111 is disposed on a face of the first housing 11 away from the second housing 12, which is used to accommodate the locking member 30, the resilient member 40 and the button 50. A valve assembly hole 112 perpendicular to the accommodating groove 111 is also disposed on the first housing 11. The accommodating groove 111 and the valve assembly hole 112 are connected with each other. After the sensor body 10 is connected to the valve assembly 20, the locking member 30 is located at a bottom of the accommodating groove 111 and locks the fixture block assembly 211. In some embodiments, a fixing block 1111 is disposed at the bottom of the accommodating groove 111, and the bottom of the accommodating groove 111 is separated by the fixing block 1111, to form slots 1112 located on both left side and right side of the fixing block 1111. The two slots 1112 are respectively located on left opposite side and right opposite side of the fixing block 1111, and both the two slots 1112 are connected with the valve assembly hole 112 (that is, the accommodating groove 111 being connected with the valve assembly hole 112 through the slot 1112).

Figure 5:
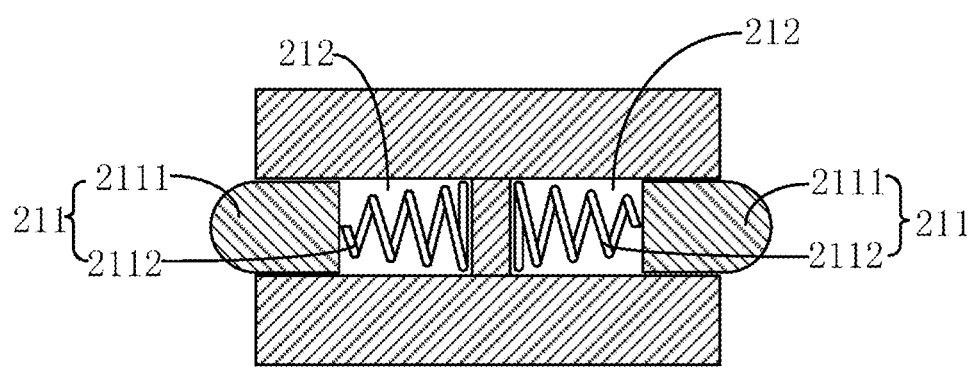
FIG. 5 is a schematic structural cross-sectional view of a connecting end of a valve assembly shown in FIG. 4.

In some embodiments, a connecting end 21 of the valve assembly 20 has a cuboid shape, and a fixture block assembly 211 that may be extend and retract relative to a side face of the connecting end 21 is respectively disposed on a left side and a right side of the connecting end. In a normal state, the fixture block assembly 211 protrudes from the side face of the connecting end 21. The fixture block assembly 211 may retract to be even with the side face of the connecting end 21 when being pressed. In some embodiments, referring to FIG. 5, a holding groove 212 is respectively disposed on left side and right side of the connecting end 21, and the fixture block assembly 211 includes a fixture block 2111 and an elastic member 2112. One end of the fixture block 2111 has a semi-spherical shape and protrudes from the side face of the connecting end 21, meanwhile the other end is located within the holding groove 212, and the fixture block 2111 is slidable within the holding groove 212. The elastic member 2112 is located within the holding groove 212, one end of the elastic member 2112 abutting against the other end of the fixture block 2111, and the other end of the elastic member 2112 abutting against the fixing block 1111.

In some other embodiments, the connecting end 21 of the valve assembly 20 may also have a cylindrical shape, a polyhedral shape, etc.

Referring to FIG. 3, FIG. 3 is a schematic structural exploded view of the tire pressure sensor. In this embodiment, a locking member 30 is U-shaped, and includes a bottom plate 31, a left end and a right end of the bottom plate 31 extending downward along a direction perpendicular to the bottom plate 31 to respectively form a first extending portion 32 and a second extending portion 33. A through hole 311 is disposed at a center of the bottom plate 31, and a first fixing hole 321 and a second fixing hole 331 are respectively disposed at one end of the first extending portion 32 and one end of the second extending portion 33 away from the bottom plate 31, the first fixing hole 321 and the second fixing hole 331 being both through holes. Shapes of the first fixing hole 321 and the second fixing hole 331 are consistent with a cross-sectional shape of the fixture block 2111, and in this embodiment, are both circular in shape. After the sensor body 10 is connected to the valve assembly 20, both the fixture blocks 2111 are respectively embedded into the first fixing hole 321 and the second fixing hole 331 (shown in FIG. 4). A first halting block 322 is disposed on an outer surface of an end (that is, an end connected to the bottom plate 31) of the first extending portion 32, and a second halting block 332 (shown in FIG. 4) is disposed on an outer surface of an end (that is, an end connected to the bottom plate 31) of the second extending portion 33. The first halting block 322 and the second halting block 332 are configured to lock the button 50 to prevent the button 50 from being detached from the accommodating groove 111. The first extending portion 32 and the second extending portion 33 are respectively embedded into the two slots 1112, the bottom plate 31 is in close contact with an upper surface of the fixing block 1111, and one end of the first extending portion 32 and one end of the second extending portion 33 are located within the valve assembly hole 112.

It may be understood that in some other embodiments, there may be only one fixture block assembly 211, which is located on a left side or a right side of the connecting end 21. Correspondingly, the locking member 30 only needs to have the first extending portion 32 without the second extending portion 33, and there may be only one slot 1112.

Figure 4:
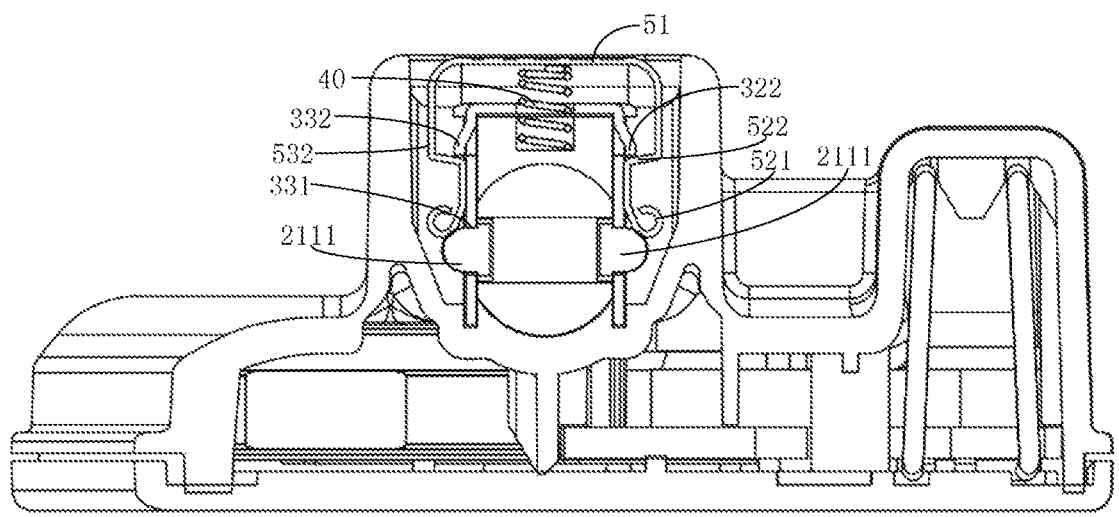
FIG. 4 is a schematic structural cross-sectional view of the tire pressure sensor shown in FIG. 1, the tire pressure sensor being in an installed state.

In some embodiments, the resilient member 40 is a spring, one end of the elastic abutting member 40 abutting against the button 50, and the other end passing through the through hole 311 and abutting against a bottom of the accommodating groove 111. It may be understood that in some other embodiments, the resilient member 40 may also be a spring piece or other elastic elements, and there may be two, three, and more resilient members 40. Referring to FIG. 3 and FIG. 4, the button 50 is U-shaped and includes a bottom wall 51. A left end and a right end of the bottom wall 51 extend downward along a direction perpendicular to the bottom wall 51 to respectively form a first side wall 52 and a second side wall 53.

An anti-slip structure (not shown) is disposed on the bottom wall 51, and the anti-slip structure may be a textured protruding structure or a convex or concave structure embossed with a logo or a character. A first curved portion 521 that is curved outward is disposed at one end of the first side wall 52 away from the bottom wall 51, the first curved portion 521 abutting against one end of the fixture block 2111. A first bent portion 522 that is bent inward is disposed between the first curved portion 521 of the first side wall 52 and the other end of the first side wall 52, and the first bent portion 522 abutting against the first halting block 322. A second curved portion 531 that is curved outward is disposed at an end of the second side wall 53 away from the bottom wall 51, the second curved portion 531 abutting against an end of the other fixture block 2111. A second bent portion 532 that is bent inward is disposed between the second curved portion 531 of the second side wall 53 and the other end of the second side wall 53, the second bent portion 532 abutting against the second halting block 332.

When the button 50 receives an external force, it transmits the external force to the fixture block assembly 211, so that the locking member 30 relieves limiting of the fixture block assembly 211. In particular, the button 50 may slide up and down within the accommodating groove 111. When the button 50 is pressed, the button 50 moves downward, and the first curved portion 521 and the second curved portion 531 respectively press fixture blocks 2111 disposed on both sides of the connecting end 21, so that the fixture blocks 2111 gradually retracts into the holding groove 212, until the fixture blocks 2111 completely retract into the holding groove 212 and are blocked by the first bent portion 522 and the second bent portion 532. In this case, the connecting end 21 of the valve assembly 20 may be easily drawn from the valve assembly hole 112. It may be understood that in some other embodiments, the resilient member 40 may no longer be a separate component, but the resilient member 40 is a spring piece. One end of the resilient member 40 is fixed to the button 50 (in particular, one end of the resilient member 40 is fixed to a lower surface of the bottom wall 51), and the other end thereof is hung in the air and may abut against an upper surface of a bottom plate 31 of the locking member 30.

It may be understood that in some other embodiments, the locking member 30 may not be a separate component, the locking member 30 and the first housing 11 are an integral structure (that is, a structure with a same shape as that of the locking member 30 is disposed at a bottom of the accommodating groove 111, the structure being integrated with the first housing 11).

An installation process of the tire pressure sensor 100 is provided. When the tire pressure sensor 100 is required to be installed, it is only required that the connecting end 21 of the valve assembly 20 is aligned with the valve assembly hole 112, and the connecting end 21 is inserted into the valve assembly hole 112 with force. When being inserted, the fixture block 2111 is pressed and completely retracts into the holding groove 212, until the fixture block 2111 is aligned with the first fixing hole 321 and the second fixing hole 331. The fixture block 2111 extends from the holding groove 212, and is embedded into the first fixing hole 321 and the second fixing hole 331, preventing the connecting end 21 from being detached from the valve assembly hole 112, further completing installation of the valve assembly 20 and the sensor body 10.

A disassembly process of the tire pressure sensor 100 is provided. When the button 50 is pressed, the button 50 moves downward, the first curved portion 521 and the second curved portion 531 respectively press fixture blocks 2111 disposed on both sides of the connecting end 21, so that the fixture blocks 2111 gradually retract into the holding groove 212, until the fixture blocks 2111 completely retract into the holding groove 212 and is blocked by the first bent portion 522 and the second bent portion 532. In this case, the connecting end 21 of the valve assembly 20 may be easily drawn from the valve assembly hole 112. Afterwards, the button 50 is released, so that the button 50 moves upward to be quickly reset under an elastic force of the resilient member 40.

It can be seen from the above that, the tire pressure sensor 100 provided in the embodiments of the present invention may insert the connecting end 21 of the valve assembly 20 into the valve assembly hole 112 when being required to be installed for use, and the locking member 30 is configured to lock the fixture blocks 2111 disposed on both sides of the connecting end 21, so that the valve assembly 20 is fixed to the sensor body 10. When disassembly is required, the button 50 is pressed, so that the button 50 presses the fixture blocks 2111, the locking member 30 no longer locks the fixture blocks 2111, and the connecting end 21 is drawn from the valve assembly hole 112. The entire process of installation and disassembly is simple and fast, and after installed, the valve assembly 20 and the sensor body 10 are firmly connected.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A tire pressure sensor, comprising: a sensor body, a valve assembly connected to the sensor body, a locking member, and a button;
    wherein, a fixture block assembly is disposed at a connecting end of the valve assembly; the locking member is disposed within the sensor body; when the connecting end is inserted into the sensor body, the locking member limits the location of the fixture block assembly; and the button is disposed on the sensor body, when the button receives an external force, the button transmits the external force to the fixture block assembly, so that the locking member relieves limiting of the fixture block assembly;
    wherein the locking member comprises a bottom plate, a left end and a right end of the bottom plate extending downward along a direction perpendicular to the bottom plate to respectively form a first extending portion and a second extending portion; and
    the first extending portion and the second extending portion being respectively embedded into two slots, and one end of the first extending portion and one end of the second extending portion being located within a valve assembly hole.

2. The tire pressure sensor according to claim 1, wherein the tire pressure sensor further comprises a resilient member, the resilient member being disposed between the locking member and the button, and the resilient member abutting against the button.

3. The tire pressure sensor according to claim 2, wherein an accommodating groove for accommodating the locking member, the resilient member, and the button is disposed within the sensor body.

4. The tire pressure sensor according to claim 3, wherein the valve assembly hole perpendicular to the accommodating groove is further disposed within the sensor body; the accommodating groove and the valve assembly hole being connected with each other.

5. The tire pressure sensor according to claim 4, wherein the two slots are disposed in the accommodating groove, and the two slots are connected with the valve assembly hole.

6. The tire pressure sensor according to claim 5, wherein a first fixing hole and a second fixing hole are respectively disposed at the first extending portion and the second extending portion;
    a holding groove is respectively disposed on a left side and a right side of the connecting end, and the fixture block assembly comprises a fixture block and an elastic member, one end of the fixture block has a semi-spherical shape and protrudes from a side face of the connecting end; the other end of the fixture block is located within the holding groove, and the fixture block is slidable within the holding groove; and
    after the sensor body and the valve assembly are connected, the two fixture blocks are respectively embedded into the first fixing hole and the second fixing hole.

7. The tire pressure sensor according to claim 6, wherein the elastic member is located within the holding groove, one end of the elastic member abuts against the other end of the fixture block.

8. The tire pressure sensor according to claim 5, wherein
    a first halting block is disposed at the first extending portion, and a second halting block is disposed at the second extending portion;
    the button comprises a bottom wall, a left end and a right end of the bottom wall extending downward along a direction perpendicular to the bottom wall to respectively form a first side wall and a second side wall; a first bent portion and a second bent portion being respectively disposed on the first side wall and the second side wall; and
    the first bent portion abutting against the first halting block, and the second bent portion abutting against the second halting block.

9. The tire pressure sensor according to claim 8, wherein
    a first curved portion that is curved outward is disposed at one end of the first side wall away from the bottom wall, the first curved portion abutting against one end of the fixture block; and
    a second curved portion that is curved outward is disposed at one end of the second side wall away from the bottom wall, the second curved portion abutting against one end of another fixture block.

10. The tire pressure sensor according to claim 1, wherein the button comprises a bottom wall, a left end and a right end of the bottom wall extending downward along a direction perpendicular to the bottom wall to respectively form a first side wall and a second side wall; and an anti-slip structure is disposed on the bottom wall.

11. The tire pressure sensor according to claim 6, wherein
    a first halting block is disposed at the first extending portion, and a second halting block is disposed at the second extending portion;
    the button comprises a bottom wall, a left end and a right end of the bottom wall extending downward along a direction perpendicular to the bottom wall to respectively form a first side wall and a second side wall; a first bent portion and a second bent portion being respectively disposed on the first side wall and the second side wall; and
    the first bent portion abutting against the first halting block, and the second bent portion abutting against the second halting block.

12. The tire pressure sensor according to claim 2, wherein the button comprises a bottom wall, a left end and a right end of the bottom wall extending downward along a direction perpendicular to the bottom wall to respectively form a first side wall and a second side wall; and an anti-slip structure is disposed on the bottom wall.

13. The tire pressure sensor according to claim 3, wherein the button comprises a bottom wall, a left end and a right end of the bottom wall extending downward along a direction perpendicular to the bottom wall to respectively form a first side wall and a second side wall; and an anti-slip structure is disposed on the bottom wall.

14. The tire pressure sensor according to claim 4, wherein the button comprises a bottom wall, a left end and a right end of the bottom wall extending downward along a direction perpendicular to the bottom wall to respectively form a first side wall and a second side wall; and an anti-slip structure is disposed on the bottom wall.

15. The tire pressure sensor according to claim 5, wherein the button comprises a bottom wall, a left end and a right end of the bottom wall extending downward along a direction perpendicular to the bottom wall to respectively form a first side wall and a second side wall; and an anti-slip structure is disposed on the bottom wall.

16. The tire pressure sensor according to claim 5, wherein the button comprises a bottom wall, a left end and a right end of the bottom wall extending downward along a direction perpendicular to the bottom wall to respectively form a first side wall and a second side wall; and an anti-slip structure is disposed on the bottom wall.

17. The tire pressure sensor according to claim 6, wherein the button comprises a bottom wall, a left end and a right end of the bottom wall extending downward along a direction perpendicular to the bottom wall to respectively form a first side wall and a second side wall; and an anti-slip structure is disposed on the bottom wall.

18. The tire pressure sensor according to claim 7, wherein the button comprises a bottom wall, a left end and a right end of the bottom wall extending downward along a direction perpendicular to the bottom wall to respectively form a first side wall and a second side wall; and an anti-slip structure is disposed on the bottom wall.

* * * * *